Sept. 26, 1950        F. C. FRANK        2,523,756

WHEEL STRUCTURE

Filed Dec. 18, 1944        4 Sheets-Sheet 1

INVENTOR.
FREDERICK C. FRANK
BY
T. J. Plante
ATTORNEY

Sept. 26, 1950      F. C. FRANK      2,523,756

WHEEL STRUCTURE

Filed Dec. 18, 1944      4 Sheets-Sheet 2

INVENTOR.
FREDERICK C. FRANK
BY T. J. Plante
ATTORNEY

Sept. 26, 1950  F. C. FRANK  2,523,756
WHEEL STRUCTURE
Filed Dec. 18, 1944  4 Sheets-Sheet 3
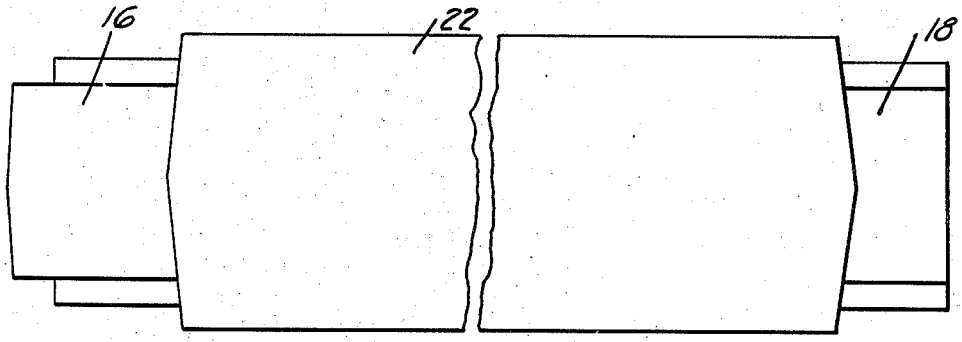
Fig.3
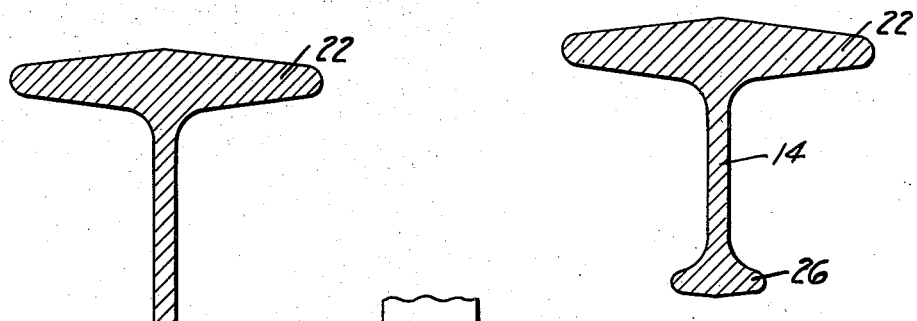
Fig.5
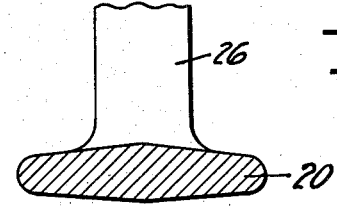
Fig.6
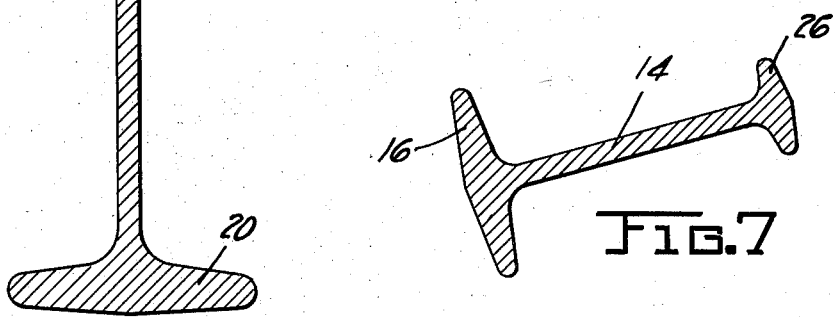
Fig.7
Fig.4
INVENTOR.
FREDERICK C. FRANK
BY T. J. Plante
ATTORNEY

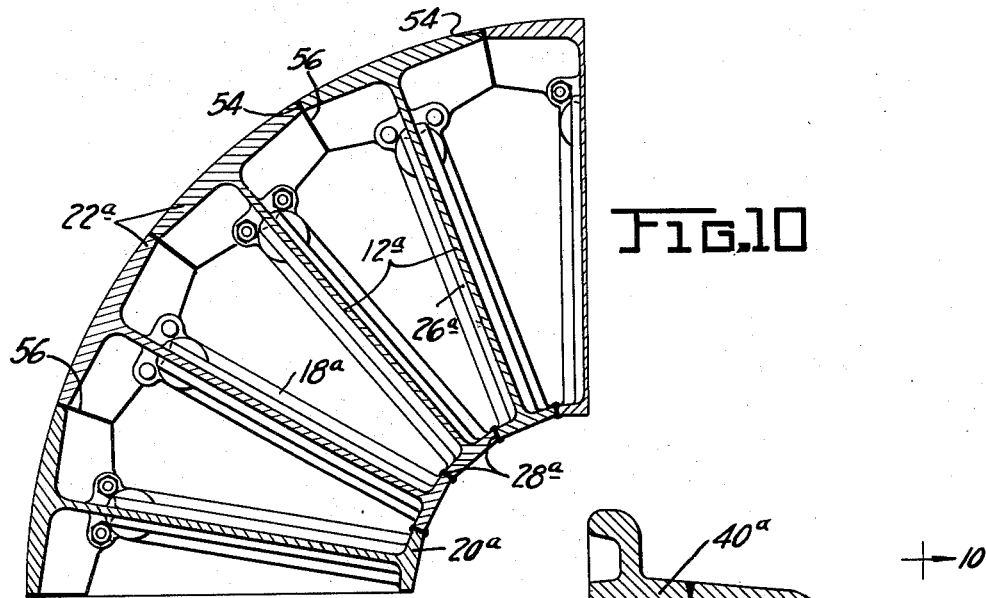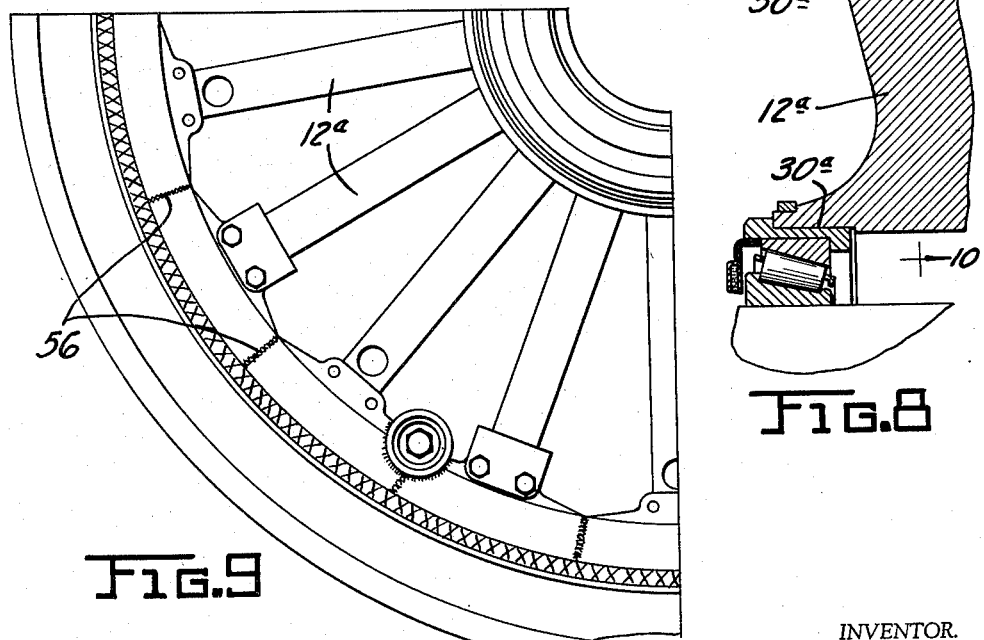

Patented Sept. 26, 1950

2,523,756

UNITED STATES PATENT OFFICE 2,523,756

WHEEL STRUCTURE

Frederick C. Frank, South Bend, Ind., assignor to Bendix Aviation Corporation, South Bend, Ind., a corporation of Delaware Application December 18, 1944, Serial No. 568,601

11 Claims. (Cl. 301—62)

This invention relates to wheels and is particularly intended for use in connection with airplane wheels but not necessarily limited to such use.

An object of the invention is to provide a very light wheel which nevertheless possesses adequate strength.

Another object of the invention is to use forged parts as the primary supporting members to withstand the wheel load, the conformation of the forged parts being such that certain conventional members may be eliminated from the wheel, thereby reducing weight and cost.

Other objects and advantages of the invention will become apparent during the course of the following description, reference being had therein to the accompanying drawings, in which:

Figure 3 is a plan view showing the outer surface of one of the forged members which make up the wheel construction of Figures 1 and 2;

Figure 1:
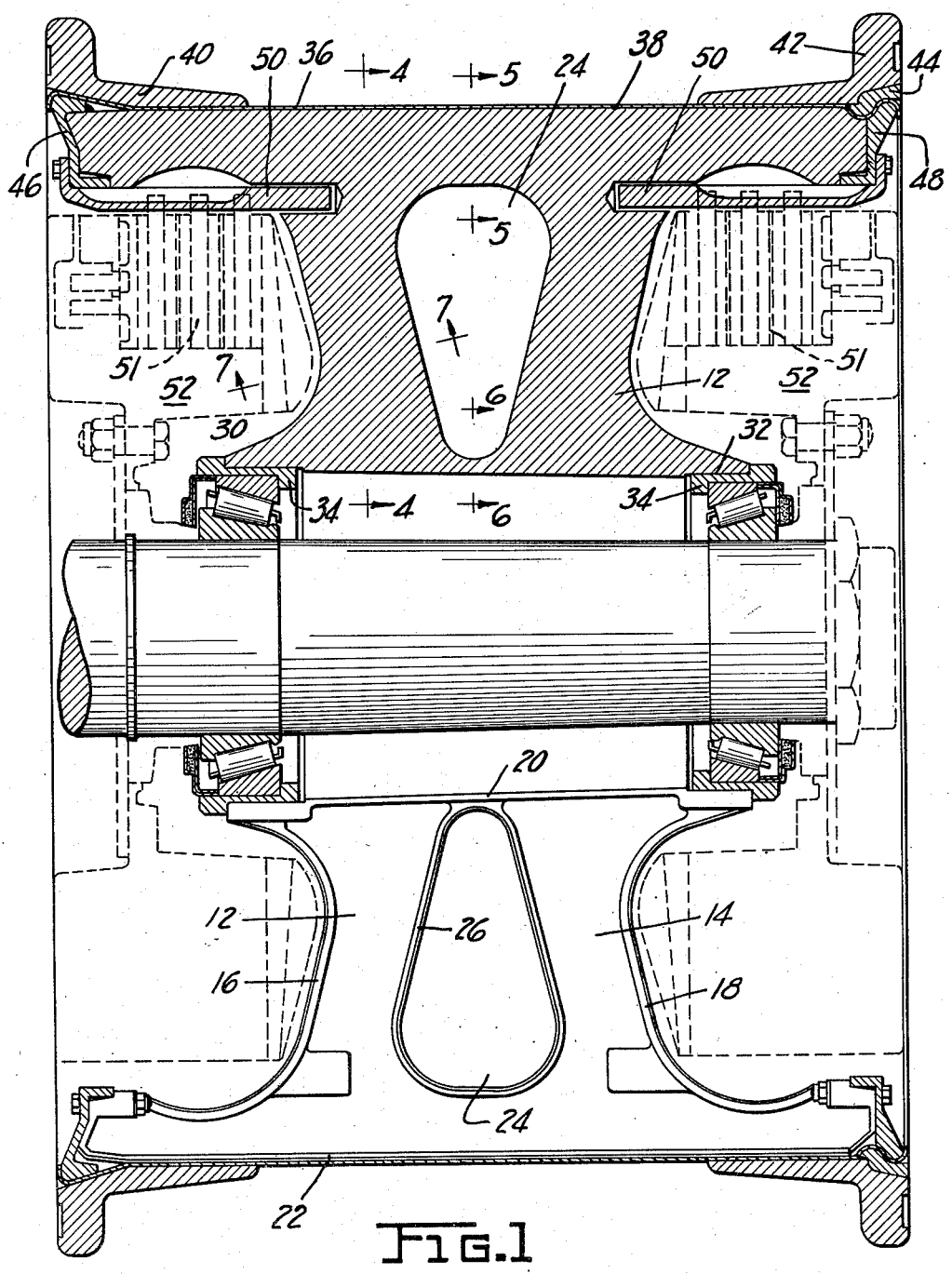
Figure 1 is a section through a wheel structure illustrating one version of my invention.

Figures 4, 5, 6 and 7 are sections taken on the lines 4—4, 5—5, 6—6 and 7—7, respectively of Figure 1, showing various portions of a single forged member;

Figure 8 is a section taken through part of a wheel construction showing a preferred embodiment of my invention;

Figure 9 is a partial end view of the wheel shown in Figure 8; and

Figure 10 is a section taken on the line 10—10 of Figure 8.

Figure 2:
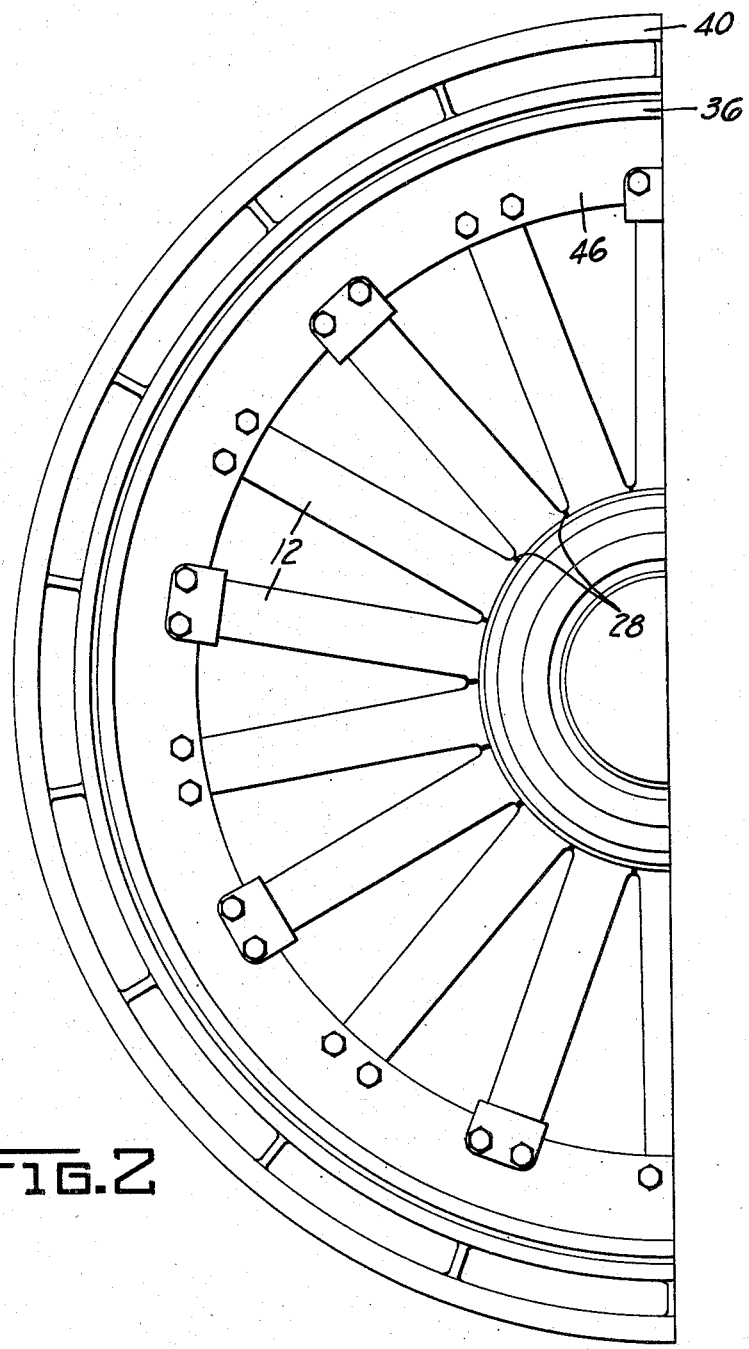
Figure 2 is a partial end view of the wheel structure of Figure 1.

As shown in the drawings, the wheel structure consists primarily of a plurality of members 12 which are preferably formed as forgings. As shown in Figure 2, these forgings are arranged side by side in the form of an annulus, which constitutes the wheel. The length dimension of the forgings is parallel to the wheel axis, and therefore the length of the forgings constitutes the width of the wheel. The height of the forgings constitutes the radial dimension of the wheel, each of the forgings constituting, in effect, a radially extending spoke, as seen in Figure 2. It will be apparent from the design of the forgings that the parting line of each forging (representing the plane of separation between the upper and lower forging dies) must lie in a plane including the axis of the wheel.

The major portion of each forging is preferably of relatively thin section, as indicated at 14, (see Figures 1, 4, 5 and 7), in order to avoid unnecessary weight. Preferably, a strengthening flange which extends in both directions from the plane of portion 14 is formed along each edge of the forging. Thus, referring to Figures 1 and 7, a strengthening flange 16 is formed on the forging at one side thereof and a similar strengthening flange 18 is formed on said forging at the other side thereof. Referring to Figures 1, 4 and 6, a flange 20 is formed on each forging along the radially inner edge thereof. Referring to Figures 1, 3, 4 and 5, a flange 22, preferably somewhat wider than the flange 20, is formed along the radially outer edge of each forging.

For further weight reduction, an opening 24, preferably somewhat egg-shaped as shown, may be left in the center of each forging. Furthermore, I prefer to provide a strengthening flange 26 formed in each forging along the edge of opening 24. The flange 26, in addition to being shown in Figure 1, is also present in Figures 5, 6 and 7.

By welding, or otherwise securing, the inner flanges 20 of the several forgings to one another, as indicated in Figure 2 at 28, I avoid the need for a separate hub, the continuous inner annulus formed by the flanges 20 of the several forged spokes constituting the wheel hub. The inner ends of the forged spokes are machined at 30 and 32 to receive bearing housings 34.

In this version of the invention, a rolled tubular rim 36 encircles the forged spokes 12, and maintains the radially outer portions of said spokes in position, the rim being preferably seam-welded to each of the spokes along the outer surface 38 of said spokes. Supported at one side of the wheel on the rim 36 is a fixed tire retaining bead 40, while a demountable tire retaining bead 42 is clamped in place at the other side of the wheel by means of the C ring 44.

To strengthen the wheel structure where the load tends to concentrate, annular extruded reinforcing members 46 and 48 may be used, each being located at one side of the wheel.

A plurality of driving keys 50 may be supported at both sides of the wheel in the forgings 12, in order to drive the rotors of dual disk brakes 51 which may be located in the brake cavities 52. If only one brake is desired, the construction may be modified accordingly. The preferred form of brake is illustrated in my application Serial No. 453,797, filed August 6, 1942 now Patent No. 2,423,882 issued July 15, 1947.

It will be noted that the stiffening flanges 16 and 18 formed at opposite sides of each forged spoke, and the flange 26 along the sides of opening 24, are inclined somewhat with respect to the vertical, in such a way that the radially outer portion of each stiffening flange is nearest to the respective end of the wheel, where the greatest loads are concentrated.

The wheel construction shown in Figures 8 to 10, which is the preferred embodiment of my invention, differs from the embodiment just described in eliminating the tubular rim, and widening the radially outer flanges on the forged spokes to bring the edges of such flanges together so that they can be welded. Referring particularly to Figures 9 and 10, it will be seen that the radially outer flanges 22a of the forged spokes 12a are arranged side by side to constitute the wheel rim, the edges of adjoining flanges being welded together along the lengthwise contacting surfaces as shown at 54, and also along the radially extending edges formed at each side of the wheel, as shown at 56. In general, the formation of the wheel shown in Figures 8 to 10 is similar to that shown in the preceding figures, except for the differences mentioned above. In the drawings, those portions of the embodiment of Figures 8 to 10 which correspond to portions shown in the embodiment of Figures 1 to 7 are indicated by the same numerals with the addition of the letter "a".

In both modifications, the radially outer surfaces 58 of the forgings are preferably turned in such a way that the arrangement of contiguous forgings will provide a substantially cylindrical outer surface. As mentioned above, the radially inner surfaces of the forgings need be turned only where the bearing housings are supported.

From the above description it will be apparent that a light but very strong structure will result from application of the principles herein described. The structure of my improved wheel is particularly adapted to sustain the loads which are imposed on it. Furthermore, the process of manufacture has been appreciably simplified.

Although particular embodiments of my invention have been described, it will be understood by those skilled in the art that the object of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. A wheel structure comprising a plurality of forgings arranged side to side to form an annulus with the long dimension of the forgings parallel to the wheel axis and substantially equal to the desired wheel width and the height of the forgings substantially equal to the radial dimension of the wheel, said forgings having flanges extending in both directions from their inner edges and welded together to constitute the hub of the wheel.

2. A wheel structure comprising a plurality of forgings arranged side to side to form an annulus with the long dimension of the forgings parallel to the wheel axis and substantially equal to the desired wheel width and the height of the forgings substantially equal to the radial dimension of the wheel, said forgings having flanges extending in both directions from their inner edges and welded together to constitute the hub of the wheel, and said forgings having relatively wide flanges extending in both directions from their outer edges and welded together to constitute the rim of the wheel.

3. A wheel structure comprising a plurality of forgings arranged side to side to form an annulus with the long dimension of the forgings parallel to the wheel axis and substantially equal to the desired wheel width and the height of the forgings substantially equal to the radial dimension of the wheel, said forgings having flanges extending in both directions from their inner edges and welded together to constitute the hub of the wheel, said forgings also having relatively wide flanges extending in both directions from their outer edges, and a tubular rim secured to and supported on said outer flanges.

4. A wheel structure comprising a plurality of forgings arranged side-to-side to form an annulus with the long dimension of the forgings parallel to the wheel axis and constituting the desired wheel width and the height of the forgings constituting the radial dimension of the wheel, said forgings having strengthening flanges formed along their edges and extending in both directions, the flanges along the radially inner edges of the several forgings being welded together to constitute the hub of the wheel, the flanges along the radially outer edges of the several forgings being relatively wide and being welded together to constitute the rim of the wheel, said forgings having centrally located weight reducing openings cut through their webs, and strengthening flanges along the edges of said openings.

5. A wheel structure comprising a plurality of forgings arranged side-to-side to form an annulus with the long dimension of the forgings parallel to the wheel axis and constituting the desired wheel width and the height of the forgings constituting the radial dimension of the wheel, said forgings having strengthening flanges formed along their edges and extending in both directions, the flanges along the radially inner edges of the several forgings being welded together to constitute the hub of the wheel, said forgings having centrally located weight reducing openings cut through their webs, and strengthening flanges along the edges of said openings.

6. In a wheel structure, a plurality of supporting members each constituted by a forging the parting line of which lies in a plane including the wheel axis, one dimension of each forging being substantially equal to the width of the wheel and another dimension of the forging being substantially equal to the radial dimension of the wheel, each of said forgings having an axially projecting tire-bead-supporting arm at each side of the wheel and having a somewhat concave outer edge extending radially inwardly from each arm, each of said forgings having a centrally located somewhat egg-shaped weight reducing opening cut through the web thereof, and each forging having strengthening flanges extending laterally in both directions and formed along all the edges of the forging including the outer edges of the weight reducing openings.

7. In a wheel structure, a plurality of supporting members each constituted by a forging, one dimension of which is substantially equal to the width of the wheel and another dimension of which is substantially equal to the radial dimension of the wheel, each of said forgings having an axially projecting tire-bead-supporting arm at each side of the wheel and having a somewhat concave outer edge extending radially inwardly from each arm, each of said forgings having a centrally located weight reducing opening cut through the web thereof, and each forging having strengthening flanges extending laterally in both directions and formed along all the edges of the forging including the outer edges of the weight reducing openings.

8. In a wheel structure, a plurality of supporting members each constituted by a forging, the parting line of which lies in a plane including the wheel axis, one dimension of each forging being substantially equal to the width of the wheel and another dimension of the forging being substantially equal to the radial dimension of the wheel, each of said forgings having an axially projecting arm at each side of the wheel and having a somewhat concave outer edge extending radially inwardly from each arm, and each forging having strengthening flanges extending laterally in both directions and formed along all the edges of the forging.

9. A wheel structure comprising a plurality of forgings arranged side-to-side to form an annulus with the long dimension of the forgings parallel to the wheel axis and constituting the desired wheel width and the height of the forgings constituting the radial dimension of the wheel, the parting line of each of said forgings lying in a plane including the wheel axis, each of said forgings having an axially projecting tire-bead-supporting arm at each side of the wheel and having a somewhat concave outer edge extending radially inwardly from each arm, said forgings having strengthening flanges formed along their edges and extending in both directions, the flanges along the radially inner edges of the several forgings being welded together to constitute the hub of the wheel, the flanges along the radially outer edges of the several forgings being relatively wide and being welded together to constitute the rim of the wheel, said forgings having centrally located weight reducing openings cut through their webs, and strengthening flanges along the edges of said openings.

10. A wheel structure comprising a plurality of forgings arranged side-to-side to form an annulus with the long dimension of the forgings parallel to the wheel axis and constituting the desired wheel width and the height of the forgings constituting the radial dimension of the wheel, each of said forgings having an axially projecting tire-bead-supporting arm at each side of the wheel and having a somewhat concave outer edge extending radially inwardly from each arm, said forgings having strengthening flanges formed along their edges and extending in both directions, the flanges along the radially inner edges of the several forgings being welded together to constitute the hub of the wheel, the flanges along the radially outer edges of the several forgings being relatively wide and being welded together to constitute the rim of the wheel, said forgings having centrally located weight reducing openings cut through their webs, and strengthening flanges along the edges of said openings.

11. A wheel structure comprising a plurality of forgings arranged side-to-side to form an annulus with the long dimension of the forgings parallel to the wheel axis and constituting the desired wheel width and the height of the forgings constituting the radial dimension of the wheel, each of said forgings having an axially projecting tire-bead-supporting arm at each side of the wheel and having a somewhat concave outer edge extending radially inwardly from each arm, said forgings having strengthening flanges formed along their edges and extending in both directions, the flanges along the radially inner edges of the several forgings being welded together to constitute the hub of the wheel, the flanges along the radially outer edges of the several forgings being relatively wide and being welded together to constitute the rim of the wheel.

FREDERICK C. FRANK.

REFERENCES CITED

The following references are of record in the file of this patent:

UNITED STATES PATENTS

| Number | Name | Date |
|---|---|---|
| 1,426,881 | Lachman | Aug. 22, 1922 |
| 1,548,230 | Wade | Aug. 4, 1925 |
| 1,640,573 | Laddon | Aug. 30, 1927 |
| 1,776,081 | Murray | Sept. 16, 1930 |
| 2,124,773 | Frank | July 26, 1938 |

FOREIGN PATENTS

| Number | Country | Date |
|---|---|---|
| 464,530 | France | 1914 |